A. H. OAKLEY.
FURNACE FOR MELTING METAL.
APPLICATION FILED APR. 20, 1905.
967,421.
Patented Aug. 16, 1910.
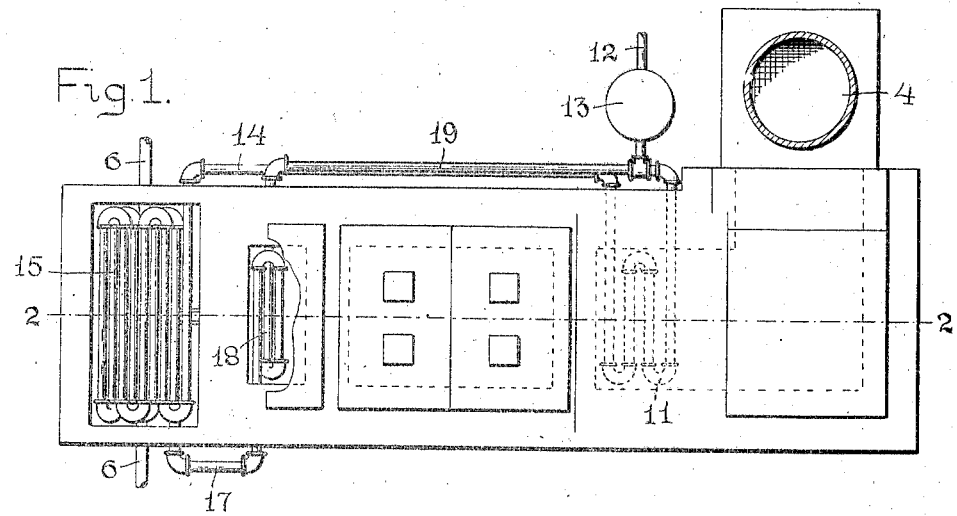
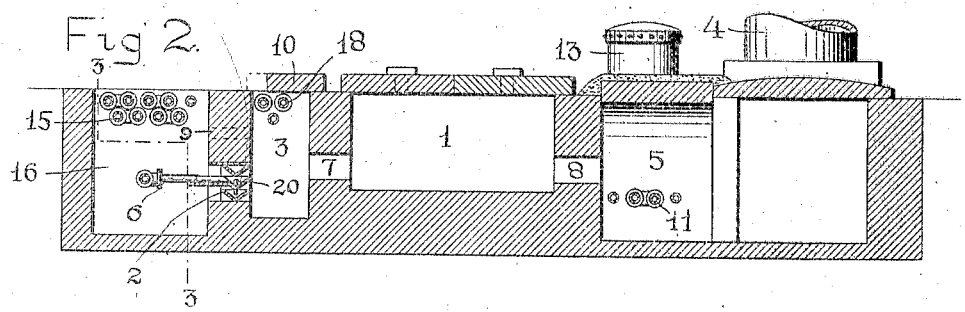
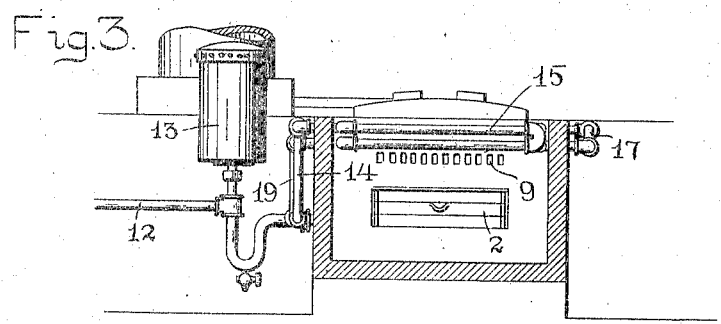
Witnesses
Roy D. Tolman.
Penelope Cumberbach
Inventor
Albert H. Oakley.
By Rufus B. Fowler
Attorney

UNITED STATES PATENT OFFICE.

ALBERT H. OAKLEY, OF MILLBURY, MASSACHUSETTS, ASSIGNOR, BY MESNE ASSIGNMENTS, TO WILLIAM E. OAKLEY, OF MILLBURY, MASSACHUSETTS.

FURNACE FOR MELTING METAL.

967,421.  Specification of Letters Patent.  Patented Aug. 16, 1910.

Application filed April 20, 1905. Serial No. 256,637.

*To all whom it may concern:*

Be it known that I, ALBERT H. OAKLEY, a citizen of the United States, residing at Millbury, in the county of Worcester and Commonwealth of Massachusetts, have invented a new and useful Improvement in a Furnace for Melting Metal, of which the following is a specification accompanied by drawings forming a part of the same, in which—

Figure 1 represents a plan view of a furnace embodying my invention. Fig. 2 is a central, longitudinal, sectional view on line 2—2, Fig. 1, and Fig. 3 is a sectional view on broken line 3—3, Fig. 2.

Similar reference letters and figures refer to similar parts in the different views.

My invention relates to a furnace designed for melting metal in crucibles and it relates to certain features of construction and arrangement of parts as hereinafter described and pointed out in the annexed claims, whereby the efficiency of the furnace is materially increased and the mixture of air and gas forming the fuel is brought under control.

My improved furnace comprises a heating chamber 1 in which the crucibles are to be placed, a series of pans 2 for liquid fuel, a mixing chamber 3 for mixing air with the gas produced by the combustion of the liquid fuel, a vertical stack or escape flue 4 and an intermediate heating chamber 5 between the escape flue and the crucible heating chamber 1. Oil is supplied to the fuel pans 2 by a feed pipe 6. The products of combustion from the liquid fuel in the pans 2 are carried into the mixing chamber 3 and by means of openings 7 and 8 are conducted through the crucible heating chamber 1 to the heating chamber 5, and from thence to the escape flue 4. A series of small openings 9 are made through the front wall of the mixing chamber 3 to admit currents of air to and thoroughly distribute them throughout the mixing chamber, in order to secure a more intimate commingling of air with the products of combustion in the mixing chamber. The top of the mixing chamber is provided with a cover 10 which is capable of being adjusted to vary the opening into the mixing chamber and control the quantity of air admitted to the mixing chamber. Arranged transversely to the heating chamber 5 and near the bottom, is a coiled pipe 11 connected with a source of water supply by a feed pipe 12, and also communicating with an expansion tank 13. The coiled pipe 11 is connected by a pipe 14 with a coiled pipe 15 placed in the upper part of the air space 16 through which air is admitted by a downward draft to the fuel pans 2. The coiled pipe 15 is connected by a pipe 17 with a coiled pipe 18 placed in the top of the mixing chamber 3, and the coiled pipe 18 is connected by a return pipe 19 with the coiled pipe 11, thereby producing a complete water circulation between the coiled pipes 11 in which the water is heated and the coiled pipes 15 and 18 by which heat is imparted to the downward currents of air fed to the fuel pans 2 and to the mixing chamber 3.

The operation of my improved furnace is as follows:—Fuel is supplied to the uppermost of the fuel pans 2 through the supply pipe 6, and from the uppermost pan fuel is supplied to the lowermost pan by a suitable overflow pipe 20. The surface of the fuel is then ignited and air passing from the chamber 16 over the tops of the fuel pans carries the flame into the mixing chamber 3, through the passages 7, crucible chamber 1 and passage 8 to the heating chamber 5, where it heats the water in the coiled pipe 11 and escapes through the flue 4. Minute currents of air are admitted through the restricted openings 9 from the air chamber 16 into the mixing chamber 3 in nearly sufficient quantities to form an efficient heating mixture with the gas generated from the burning fuel. The remaining air necessary to complete the mixture is admitted to the top of the mixing chamber 3 by partially withdrawing the cover 10 and the amount of air thus admitted as required to produce the best results is controlled by the adjustment of the cover 10. The air admitted to the chamber 16 is heated by its contact with the coiled water pipes 15, and the air admitted to the top of the mixing chamber 3 is heated by its contact with the coiled pipes 18, and this heat is supplied from the coiled pipe 11 placed in the heating chamber 5, by which the waste heat in its passage from the crucible chamber 1 to the flue 4 is utilized. The difference in the level between the coils 15 and 18 and the heating coil 11 is sufficient to secure a suitable water circulation.

What I claim as my invention and desire to secure by Letters Patent is:—

1. A furnace having an air chamber and a mixing chamber, means for heating the air admitted to said air chamber, a passage from said air chamber to said mixing chamber, means for producing an inflammable mixture in said passage, a second air passage from said air chamber to said mixing chamber separate from said first passage, adjustable means for admitting air from outside said air chamber to said mixing chamber, and means for heating the air so admitted.

2. A furnace having a fuel mixing chamber and an air chamber, means for heating the air in said air chamber, separate passages from said air chamber to said mixing chamber, pans for liquid fuel placed in one of such passages, adjustable means for admitting air from outside said air chamber to said mixing chamber, and means for heating the air so admitted.

3. A furnace having a fuel mixing chamber and an air chamber, both of said chambers having separate entrances for air and also air passages connecting said chambers, means for admitting an inflammable mixture to said mixing chamber, and a water circulation, comprising a coil of pipe in the path of the products of combustion from said mixing chamber, a separate coil of pipe at the entrance to each chamber, said separate coils arranged upon a higher plane than said first coil, and pipes connecting said coils.

4. A furnace having a fuel mixing chamber and an air chamber, both of said chambers having separate entrances for air and also air passages between said chambers, means for admitting an inflammable mixture to said mixing chamber, and a water circulation, comprising a coil of pipe in the path of the products of combustion from said mixing chamber, a separate coil of pipe in the path of the air admitted to each chamber, and pipes connecting said coils.

5. The combination of a crucible heating chamber and an escape flue, an air chamber, a heating chamber between said crucible heating chamber and said escape flue, and coiled pipes in said air chamber and in said heating chamber between said crucible heating chamber and said escape flue forming part of a hot water circulation, said water being heated in said heating chamber and designed to warm the air in said air chamber.

6. In a crucible heating furnace, the combination with a crucible heating chamber and an escape flue, of an air chamber, a hot water coil in said air chamber and a second hot water coil in the path of the products of combustion to said escape flue, and means for connecting said water coils, whereby a water circulation is established.

7. A furnace having a liquid fuel burner, a mixing chamber to receive the products of combustion from said burner, means for admitting air to said mixing chamber, and a water circulation, comprising a coil of pipe in the path of said products of combustion from said chamber, a second coil of pipe in the path of the air admitted to said chamber and pipes connecting said coils.

ALBERT H. OAKLEY.

Witnesses:
PENELOPE COMBERBACH,
RUFUS B. FOWLER.